United States Patent [19]

Antos

[11] 3,994,832

[45] Nov. 30, 1976

[54] METHOD OF PREPARING A REFORMING CATALYST

[75] Inventor: George J. Antos, Arlington Heights, Ill.

[73] Assignee: UOP Inc., Des Plaines, Ill.

[22] Filed: Sept. 26, 1975

[21] Appl. No.: 616,984

Related U.S. Application Data

[63] Continuation-in-part of Ser. No. 448,611, March 6, 1974, abandoned.

[52] U.S. Cl. ............................... 252/464; 252/463; 252/466 PT
[51] Int. Cl.² ...................... B01J 23/14; B01J 23/18; B01J 23/62; B01J 23/64
[58] Field of Search ............... 252/463, 464, 466 PT

[56] References Cited
UNITED STATES PATENTS

| | | | |
|---|---|---|---|
| 2,840,532 | 6/1958 | Haensel | 252/466 PT |
| 3,152,865 | 10/1964 | Koch | 252/466 PT |
| 3,759,841 | 9/1973 | Wilhelm | 252/466 PT |

*Primary Examiner*—W. J. Shine
*Attorney, Agent, or Firm*—James R. Hoatson, Jr.; Robert W. Welch; William H. Page, II

[57] ABSTRACT

A method of preparing a catalytic composite preferably containing a platinum component and a tin component. A refractory inorganic oxide support is impregnated with a chelating agent and thereafter with a solution of a compound of a metal of Groups IVA and VA to effect a better dispersion of the Group IVA and VA metal component thereon. The platinum group metal component is preferably impregnated on the support from a common impregnating solution with the Group IVA and VA metal component.

6 Claims, No Drawings

METHOD OF PREPARING A REFORMING CATALYST

CROSS-REFERENCE TO RELATED APPLICATIONS

This application is a continuation-in-part of copending application Ser. No. 448,611 filed Mar. 6, 1974, now abandoned.

The reforming of gasoline boiling range feed stocks to improve the octane rating thereof is a process well-known to the petroleum industry. The feed stock may be a full boiling range gasoline fraction boiling in the 50°–425° F. range, although it is more often what is commonly called naphtha — a gasoline fraction characterized by an initial boiling point of from about 150° to about 250° F. and an end boiling point of from about 350° to about 425° F.

The reforming of gasoline boiling range feed stocks is generally recognized as involving a number of octane-improving hydrocarbon conversion reactions requiring a multi-functional catalyst. In particular, the catalyst is designed to effect several octane-improving reactions with respect to paraffins and naphthenes — the feed stock components that offer the greatest potential for octane improvement. Thus, the catalyst is designed to effect isomerization, dehydrogenation, dehydrocyclization and hydrocracking of paraffins. Of these hydrocarbon conversion reactions, dehydrocyclization produces the greatest gain in octane value and is therefore a favored reaction. For naphthenes, the principal octane improving reactions involve dehydrogenation and ring isomerization to yield aromatics of improved octane value. With most naphthenes being in the 65–80 F-1 clear octane range, the octane improvement, while substantial, is not as dramatic as in the case of the lower octane paraffins. Reforming operations thus employ a multi-functional catalyst designed to provide the most favorable balance between the aforementioned octane-improving reactions to yield a product of optimum octane value, said catalyst having at least one metallic hydrogenation component and an acid-acting hydrocracking component. However, even with the achievement of the desired balance between the octane-improving reactions, problems persist relating principally to undesirable side reactions, which, although minimal, cumulatively contribute to carbon formation, catalyst instability and product loss. Thus, demethylation occurs with the formation of excess methane; excessive hydrocracking produces light gases; cleavage or ring opening of naphthenes results in the formation of low octane, straight chain hydrocarbons; condensation of aromatics forms coke precursors and carbonaceous deposits; and the acid catalysed polymerization of olefins and other polymerizable material yields high molecular weight hydrocarbons subject to dehydrogenation and further formation of carbonaceous matter.

Accordingly, an effective reforming operation is dependent on the proper selection of catalyst and process variables to minimize the effect of undesirable side reactions for a particular hydrocarbon feed. However, the selection is complicated by the fact that there is an interrelation between reaction conditions relating to undesirable side reactions and desirable octane-improving reactions. Reaction conditions selected to optimize a particular octane-improving reaction may, and often do, also promote one or more undesirable side reactions. For example, as previously indicated, some hydrocracking is desirable since it produces lower boiling hydrocarbons of higher octane value than the parent hydrocarbons. But hydrocracking of the lower boiling $C_6$–$C_8$ constituents is not desirable since it produces still lower boiling hydrocarbons, such as butane, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and the reaction can therefore be controlled by limiting hydrogen concentration in the reaction media. Low hydrogen partial pressures have a further advantage in that the main octane-improving reactions, i.e., dehydrogenation of paraffins and naphthenes, are net producers of hydrogen and, as such, favored by low hydrogen pressures.

Catalysts comprising a supported platinum group metal, for example platinum supported on alumina, are widely known for their selectivity in the production of high octane aromatics, general activity with respect to each of the several octane-improving reactions which make up the reforming operation, and for their stability at reforming conditions. One of the principal objections to low pressure reforming relates to its effect on catalyst stability. This stems from the fact that low pressure operation tends to favor the aforementioned condensation and polymerization reactions believed to be the principal reactions involved in the formation of coke precursors and carbon deposits so detrimental to catalyst stability.

More recently, the industry has turned to certain multi-component or bi-metallic catalysts to make low pressure reforming, and all the advantages attendant therewith, a reality. While rhenium and the Group IVA metals, tin and germanium, have been utilized in making catalysts with excellent activity, selectivity and stability, even at low pressures, suitable care must be observed in the preparation of these catalysts to optimize their performance characteristics.

Since catalysis is known to be primarily a surface phenomenon, it is generally the practice to employ a catalytic component dispersed on the surface of a suitable support or carrier material, usually a porous, high surface area refractory inorganic oxide such as alumina. Although the catalytic component may be dispersed on the support surface in various ways, the dispersion is usually by means of an aqueous impregnating solution of a suitable precursor compound of the desired catalytic component. The impregnated support is subsequently dried and calcined to decompose said compound and form the desired catalytic component deposited on the support. However, it has been observed that when using the simple impregnating techniques with certain of the promoter metals such as tin, the resulting catalytic composite frequently exhibits poor performance characteristics in the reaction under study. It has become apparent that the interaction of the support with certain promoter metal cations leads to undesirable results. It is contemplated that the problem originates in the ease with which the metal cations of Groups IVA and VA are hydrolyzed. In the impregnating process, the hydroxide anions which invariably occur on the support surface become labile under the influence of the anions present in the impregnating solution, and the readily hydrolyzable Group IVA and VA metal cations are converted to a hydroxy species subject to polymerization and precipitation from the solution. Thus, the hydrolysis and precipitation of the promoter metals occur largely on the outer or peripheral surface area of the support to the substantial exclusion of the extensive internal surface area provided by the internal pore structure of the support. The result is a poor dispersion of the promoter metal on the support surface, and a catalytic composite of relatively poor activity, selectivity and/or stability. Thus, while the hydrolyzing influence of the support surface has little apparent affect on the dispersion of the platinum group metal component, it has a very decided affect with respect to the dispersion of the Group IVA and VA metal component thereon. Michalko, in U.S. Pat. No. 2,927,088, has shown that improved platinum dispersions can be effected utilizing certain carboxylic acids, preferably as a component of a platinum-containing impregnating solution. The disclosed carboxylic acids function to retard the deposition of the platinum component until such time as the solution has thoroughly penetrated the porous structure of the support. It has now been found that certan chelating agents, namely aminopolycarboxylic acids, will perform essentially the same function with respect to the Group IVA and VA metals, albeit by a somewhat different mechanism. In the latter case, the chelating agent has been found to obviate the hydrolyzing influence of the support surface to preclude the premature precipitation and polymerization of a Group IVA and VA metal component, provided that said chelating agent is impregnated on the support in advance of said metal component. This is in contrast, for example, to the teaching of U.S. Pat. No. 2,889,287, which teaches the impregnation of the support with a dispersion of a chelate of the metal component and an amino acid.

It is an object of this invention to present a novel method of preparing a Group IVA-VA metal-containing catalyst, said method being particularly useful to effect an improved dispersion of the Group IVA-VA metal component on the refractory inorganic oxide support. It is a further object to present a novel method of preparing an alumina supported platinum catalyst containing a tin promoter, said method being particularly useful to effect an improved dispersion of the tin component on the support.

In one of its broad aspects, the present invention embodies a method of preparing a refractory inorganic oxide-supported catalyst which comprises substantially obviating the hydrolyzing effect of the refractory inorganic oxide support by impregnating the same with a chelating agent; treating said support in contact with a solution of a compound of a metal of Groups IVA and VA and forming a chelate of said metal impregnated on said support; and drying and calcining the impregnated support at a temperature to decompose said chelate.

One of the more specific embodiments of the present invention is in a method of preparing an alumina supported catalyst which comprises substantially obviating the hydrolyzing effect of the alumina support by impregnating the same with ethylenediaminetetraacetic acid; treating said support in contact with a common solution of chloroplatinic acid and stannic tetrachloride with the formation of a platinum component and a tin chelate impregnated on said support; and drying and calcining the impregnated support at a temperature to decompose said chelate.

Other objects and embodiments of this invention will become apparent in the following detailed specification.

Pursuant to the method of the present invention, a refractory inorganic oxide support or carrier material is impregnated with a chelating agent prior to impregnation with a compound of a metal of Groups IVA and VA, that is, a compound of germanium, tin, lead, antimony and/or bismuth. The refractory inorganic oxides herein contemplated include the naturally occurring or synthetically prepared refractory inorganic oxides such as alumina, silica, zirconia, thoria, boria, etc., or combinations thereof like silica-alumina, silica-zirconia, alumina-zirconia, etc. The preferred refractory inorganic oxide for use in the present invention is alumina. It is preferred to employ a porous, adsorptive, high surface area material characterized by a surface area of from about 25 to about 500 square meters per gram. Preferred auminas thus include gamma-alumina, eta-alumina, theta-alumina, and mixtures thereof, with the first mentioned gamma-alumina having preference. A particularly preferred gamma-alumina is characterized by an average bulk density of from about 0.30 to about 0.70 grams per cubic centimeter, an average pore diameter of from about 50 to about 150 Angstroms, an average pore volume of from about 0.1 to about 1.0 cubic centimeters per gram, and a surface area of from about 150 to about 500 square meters per gram.

The alumina support or carrier material is typically employed in a shape or form determinative of the desired shape or form of the final catalyst product e.g., spheres, pills, granules, extrudates, powder, etc. A particularly preferred form is the sphere, especially alumina spheres prepared substantially in accordance with the oil-drop method described in U.S. Pat. No. 2,620,314. Briefly, said method comprises dispersing droplets in an alumina sol-ammonia precursor mixture in a hot oil bath. The droplets are retained in the oil bath until they set into firm gel spheroids. The spheres are continuously separated from the bath and subjected to specific aging treatments to provide certain desirable properties. The spheres are subsequently dried at from about 105° to about 395° F. and thereafter calcined at from about 800° to about 1400° F.

It has been found that the chelating agent impregnated on the refractory inorganic oxide support substantially obviates the hydrolyzing effect thereof with respect to the ions of metals of Groups IVA and VA contaned in the subsequent impregnating solution. The chelating agent thus permits impregnation of the support without premature precipitation of the Group IVA and VA metal compound from the impregnating solution, and the ions of the metals of Group IVA and VA are attracted to the chelating agent, and adsorbed and dispersed on the surface of said support as a metal chelate.

Chelating agents suitable for use in the present invention include aminopolycarboxylic acids such as ethylenediaminetetraacetic acid, N-hydroxyethylenediaminetetraacetic acid, diethylenetriaminepentaacetic acid, cyclohexanediaminetetraacetic acid, ethyleneglycol-bis-(beta-aminoethylether)-N,N'-tetraacetic acid, nitrilotriacetic acid or ammoniatriacetic acid, and other well-known chelating agents, for example glutamic acid, aspartic acid, triethylenetriamine, tetraethylenepentamine, etc.

The refractory inorganic oxide support may be impregnated with the chelating agent by conventional impregnating techniques known to the art. Thus, the support may be soaked, dipped, or otherwise immersed in an aqueous solution of the chelating agent and the water solvent subsequently dried or evaporated from the support. In some cases, water-insoluble chelating agents may be employed as a water soluble salt thereof. Chelating agents such as ethylenediaminetetraacetic acid and the like are suitably solubilized in aqueous ammoniacal solution.

Pursuant to the present invention, the chelate-impregnated support is treated in contact with a compound of a metal of Groups IVA and VA whereby a chelate of said metal is formed impregnated on said support. The Group IVA and VA metal component is preferably tin, and suitable tin compounds include stannous chloride, stannous bromide, stannous fluoride, stannic chloride, stannic iodide, stannic sulfate, stannic chloride trihydrate, stannic chloride tetrahydrate, stannic chloride pentahydrate, stannic chloride diamine, stannic chromate, stannic tartrate, and the like. The selected tin compound is employed in an amount to yield a final catalyst composite containing from about 0.01 to about 5.0 wt. % calculated on an elemental basis. Compounds of other metals of Groups IVA and VA suitable for use herein include germanium tetrachloride, lead chloride, antimony trichloride, antimony pentachloride, bismuth trichloride, and the like.

Preferably, the catalyst of this invention is prepared to also contain a platinum group metal component. While the platinum group metal component can be impregnated on the support either prior to or subsequent to the chelating agent and/or Group IVA and VA metal component, it is a preferred practice to impregnate the platinum group metal component on the support from a common impregnating solution with the Group IVA and VA metal component. Suitable platinum group metal compounds, i.e., compounds of platinum, palladium, rhodium, ruthenium, osmium and iridium, include platinum chloride, chloroplatinic acid, ammonium chloroplatinate, dinitrodiamino platinum, palladium chloride, chloropalladic acid, and the like. Chloroplatinic acid is particularly suitable in common solution with stannous or stannic chloride. The selected platinum group metal compound is suitably utilized in an amount to yield a final catalyst composite containing from about 0.01 to about 2.0 wt. % platinum group metal calculated on an elemental basis.

Impregnating conditions employed herein involve conventional impregnating techniques known to the art. Thus, the catalytic components, or soluble compounds thereof, are adsorbed on the carrier material by soaking, dipping, suspending, or otherwise immersing the carrier material in the impregnating solution, suitably at ambient temperature conditions. The carrier material is preferably maintained in contact with the impregnating solution at ambient temperature conditions for a brief period, preferably for at least about 30 minutes, and the impregnating solution thereafter evaporated substantially to dryness at an elevated temperature. For example, a volume of alumina particles is immersed in a substantially equal volume of impregnating solution in a steam-jacketed rotary dryer and tumbled therein for a brief period at about room temperature. Thereafter, steam is applied to the jacket of the dryer to expedite the evaporation of said solution and recovery of substantially dry impregnated support or carrier material.

Regardless of the details of how the components of the catalyst are combined with the porous carrier material, the final catalyst composite generally will be calcined in an oxidizing atmosphere such as air at a temperature of from about 400° to about 1200° F. The catalyst particles are advantageously calcined in stages to experience a minimum of breakage. Thus, the catalyst particles are advantageously calcined for a period of from about 1 to about 3 hours in an air atmosphere at a temperature of from about 400° to about 700° F., and immediately thereafter at a temperature of from about 900° to about 1200° F. in air for a period of from about 3 to about 5 hours.

The catalyst of this invention is preferably prepared to contain from about 0.1 to about 5.0 wt. %, and preferably from about 0.4 to about 2.0 wt. % halogen component to enhance the acidic function of the catalyst in the traditional manner. The halogen component may be chlorine, fluorine, bromine, iodine, or mixtures thereof. Of these, fluorine, and particularly chlorine, are preferred for the purpose of this invention. Best results are generally obtained when the halogen content of the catalyst is adjusted during the calcination step by including a halogen or a halogen-containing compound in admixture with steam in the oxidizing atmosphere. In particular, when the halogen is chlorine, it is a preferred practice to use steam and hydrochloric acid in a mole ratio of from about 20:1 to about 100:1 during at least a portion of the calcination step in order to adjust the final chlorine content of the catalyst in the desired range.

It is preferred that the resultant calcined catalytic composite be subjected to a substantially water-free reduction step prior to its use in the conversion of hydrocarbons. This step is designed to further insure a uniform and finely divided dispersion of the metallic components throughout the carrier material. Preferably, substantially pure and dry hydrogen (i.e. less than 20 volume ppm $H_2O$) is used as the reducing agent in this step. The reducing agent is contacted with the oxidized catalyst at conditions including a temperature of from about 800° to about 1200° F. This reduction may be performed in situ as part of a start-up sequence if precautions are taken to predry the plant to a substantially water-free state and if substantially water-free hydrogen is used. The duration of this step is preferably less than about 2 hours and typically about 1 hour.

Reforming of gasoline feed stocks in contact with the catalyst of this invention as herein contemplated, is suitably effective at a pressure of from about 50 to about 1000 psig and at a temperature of from about 800° to about 1100° F. The catalyst of this invention permits a stable operation to be carried out in a preferred pressure range of from about 50 to about 350 psig, utilizing a hydrogen to hydrocarbon mole ratio of from about 0.5:1 to about 10:1 and a LHSV of from about 0.5 to about 10. Preferably, the temperature employed is in the range of from about 900° to about 1050° F.

Although the catalyst composition of this invention is most suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of lower hydrocarbon molecules such as those occurring in the kerosine and gas oil boiling range, and the oxidation of hydrocarbons to produce first, second and third stage oxidation products. Reaction conditions employed in the various hydrocarbon conversion reactions are those heretofore practiced in the art. For example, alkylaromatic isomerization reaction conditions include a temperature of from about 32° to about 1000° F., a pressure of from about atmospheric to about 1500 psig, a hydrogen to hydrocarbon mole ratio of from about 0.5:1 to about 20:1 and a LHSV of from about 0.5 to about 20. Likewise, typical hydrocracking reaction conditions include a pressure of from about 500 to about 3000 psig, a temperature of from about 390° to about 935° F., a LHSV of from about 4.1 to about 10, and a hydrogen circulation rate of from about 1000 to about 10,000 SCF/BBL (standard cubic feet per barrel of charge).

The following examples are presented in illustration of the method of this invention and are not intended as an undue limitation on the generally broad scope of the invention as set out in the appended claims.

EXAMPLE I

A catalyst support material was treated with a chelating agent according to the method of this invention by dissolving 6.17 grams of ethylenediaminetetraacetic acid in 5 cubic centimeters of concentrated ammonium hydroxide and diluting the solution to 500 cubic centimeters with water. Approximately 500 cubic centimeters of ⅛ inch gamma-alumina spheres were then immersed in the solution contained in a steam jacketed rotary dryer. The spheres were tumbled in the solution for about ½ hour at room temperature, after which steam was applied to the dryer jacket and the solution evaporated to dryness in contact with the tumbling spheres.

The ability of the chelate-treated base to prevent hydrolysis was tested as follows. A solution containing a small amount of potassium iodide (to simulate an impregnating solution containing anions) was placed in three separate beakers. Ten cubic centimeters of the chelate-treated base were poured into beaker A, while 10 cubic centimeters of untreated ⅛ inch gamma-alumina spheres were added to each of beakers B and C. No precipitate was formed in any of the beakers. A solution prepared by dissolving stannic chloride pentahydrate in water was then added to beakers A and B. Immediate precipitate formation was noted in beaker B. No precipitate was formed within 30 minutes in beaker A. This demonstrates the ability of the chelate treatment to prevent the hydrolysis of cations, in particular tin, by interaction with the hydroxyl-supplying support material.

EXAMPLE II

A catalyst was prepared according to the method of this invention as follows. About 100 cubic centimeters of the chelate impregnated alumina spheres were impregnated with a common solution of stannic chloride and chloroplatinic acid. The impregnating solution was prepared by dissolving 0.37 grams of stannic chloride pentahydrate in 2.5 cubic centimeters of concentrated hydrochloric acid and 20 cubic centimeters of water. Then 18.8 cubic centimeters of chloroplatinic acid (10 milligrams of platinum per cubic centimeter) was added and the resulting solution diluted to 100 cubic centimeters with water. The chelate-impregnated spheres were tumbled in the impregnating solution for about ½ hour at room temperature utilizing a steam jacketed rotary dryer. Steam was thereafter applied to the dryer jacket and the solution evaporated to dryness in contact with the chelate impregnated alumina spheres. The dried spheres were subsequently heated to 392° F. in air and, after about ½ hour at said temperature, heated to about 1000° F. in air and held at 1000° F. for 2½ hours. The spheres were then treated in a substantially pure hydrogen stream for about 1 hour at 1050° F. to yield the reduced form of the catalyst. The final catalyst product contained 0.375 wt. % platinum and 0.25 wt. % tin, calculated as the elemental metal.

EXAMPLE III

A catalyst was prepared substantially as described in the previous example except that the chelate impregnation step was omitted. Thus, 100 cubic centimeters of ⅛ inch alumina spheres were impregnated with a common impregnating solution prepared by dissolving 0.37 grams of stannic chloride pentahydrate in 2.5 cubic centimeters of concentrated hydrochloric acid and 20 cubic centimeters of water, adding 18.8 cubic centimeters of chloroplatinic acid thereto, and diluting the resulting solution to 100 cubic centimeters with water. The spheres were tumbled in the impregnating solution for about ½ hour at room temperature, after which the solution was evaporated to dryness in contact with the spheres. The dried spheres were heated to 395° F. in air, and after about ½ hour at said temperature, heated to about 1000° F. in air and held at 1000° F. for 2½ hours. The spheres were then treated in a substantially pure hydrogen stream for about 1 hour at 1050° F. to yield the reduced form of the catalyst. The final catalyst poroduct contained 0.375 wt. % platinum and 0.25 wt. % tin, calculated as the elemental metal.

The catalyst of Examples II and III were evaluated under identical conditions with respect to the dehydrocyclization of n-hexane. Thus, n-hexane is contacted with each of the catalysts at a temperature of about 550° C. and at a pressure of approximately 250 millimeters. The results are tabulated below.

| Catalyst | Conversion Of n-Hexane | Selectivity To Benzene | Selectivity To Methane | Yield Of Benzene |
|---|---|---|---|---|
| Example II | 96% | 89% | 11% | 85% |
| Example III | 79% | 84% | 13% | 66% |

I claim as my invention:
1. A method of preparing a refractory inorganic oxide supported catalyst which comprises:
 a. substantially obviating the hydrolyzing effect of a refractory inorganic oxide support by impregnating the same with a solution of an aminopolycarboxylic acid chelating agent;
 b. heating said support in contact with a solution of a salt of a metal selected from the group consisting of germanium, tin, lead, antimony and bismuth, wherein said aminopolycarboxylic acid forms a chelate of said metal impregnated on said support; and c. subsequently drying and calcining the impregnated support at a temperature of from about 400° to about 1200° F to decompose said chelate.

2. The method of claim 1 further characterized in that said refractory inorganic oxide support is an alumina support.

3. The method of claim 1 further characterized in that said aminopolycarboxylic acid chelating agent is ethylenediaminetetraacetic acid.

4. The method of claim 1 further characterized in that said metal salt is stannic chloride.

5. The method of claim 1 further characterized with respect to (b) in that said solution has additionally a salt or an acid of a platinum group metal.

6. The method of claim 5 further characterized in that said platinum group metal acid is chloroplatinic acid and said salt of a metal is stannic chloride.

* * * * *